United States Patent [19]
Parker

[11] 3,907,893
[45] Sept. 23, 1975

[54] PREPARATION OF ANTIOXIDANT AMIDES

[75] Inventor: Dane K. Parker, Canton, Ohio

[73] Assignee: The Goodyear Tire & Rubber Company, Akron, Ohio

[22] Filed: June 28, 1974

[21] Appl. No.: 484,050

[52] U.S. Cl......... 260/562 R; 260/45.9; 260/561 N; 260/562 P
[51] Int. Cl.²...................................... C07C 103/44
[58] Field of Search ......... 260/561 N, 562 P, 562 R

[56] References Cited
UNITED STATES PATENTS
3,538,159  11/1970  Duffy.............................. 260/561 R OTHER PUBLICATIONS
Singh, Tetrahedron Lett., 1971, (4), 321–322, Abstracted at C.A. 75, 1935.

J. Org. Chem., (1963), 28, 2915.

Primary Examiner—C. Davis
Attorney, Agent, or Firm—F. W. Brunner; C. R. Schupbach; J. A. Rozmajzl

[57] ABSTRACT

A process for the preparation of antioxidant aromatic amides using carboxylic esters, alkoxide and amide bases, and primary amines as starting materials. Unsaturated products produced using this process are sufficiently pure for use as comonomers in the preparation of elastomers.

6 Claims, No Drawings

PREPARATION OF ANTIOXIDANT AMIDES

This invention relates to an improved process for preparing antioxidant compositions. More particularly the invention relates to a process for preparing aromatic amides which give polymer compositions containing these aromatic amides a high degree of resistance to the deleterious effects of oxidative aging over a prolonged period of time.

Natural and synthetic rubbers of essentially all types and particularly diene rubbers are known to be susceptible to deterioration resulting from exposure to oxidative aging. Much effort has been expended to develop various antioxidants that will effectively inhibit the adverse effects of polymer aging. Many of the antioxidants in current use may be volatilized when the polymer products are exposed to elevated temperatures for a prolonged period of time. These antioxidants are also rather quickly extracted from polymer compositions by repeated washings with aqueous detergent solutions or a wide range of organic solvents. These severe conditions are encountered, for example, by rubber backed fabrics which are subjected to frequent launderings and dry cleaning.

Aromatic amides are currently prepared with potentially toxic materials such as acyl chlorides. The preparation requires the use of expensive glass lined reactors. Some reactions produce by-products such as hydrochloric acid which must be disposed safely.

Ester/amine procedures for the production of N-substituted aromatic methacrylamides produce an intermediate metallic salt which is hydrolyzed in solution to produce the methacrylamide. These methacrylamides as obtained prevent copolymerization unless extensive purification of the methacrylamides is carried out.

It is an object of the present invention to provide an improved process of manufacturing antioxidant amides. Further objects will become apparent to those skilled in this art as the description proceeds.

It has now been discovered that methacrylamides produced by an ester/amine process can be made sufficiently pure to be used as comonomers in polymerization reactions and act as built-in antioxidants to prevent oxidative degradation. Non-polymerizable methacrylamides are produced in an equally pure condition.

Prior art ester/amine procedures consist essentially of simply hydrolyzing the entire solution without the removal of the intermediate metallic salt. The product of the previous procedures was contaminated with starting materials such as p-aminodiphenylamine which completely stopped copolymerization processes normally possible with amides produced from unsaturated ester starting materials. The process of this invention isolates the intermediate salt, washes it with a suitable organic solvent, and then hydrolyzes only the salt, producing a monomer which can be copolymerized or built-in to polymeric materials. Non-polymerizable amides are also produced in a pure condition.

In accordance with the present invention amides are synthesized by reacting simple aliphatic or aromatic esters, both saturated and unsaturated, having the general formula (A)

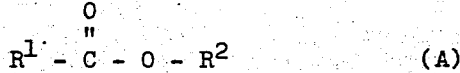

with aromatic amines having the general formula (B)

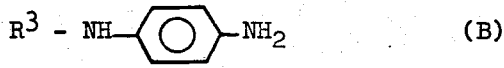

in the presence of (C) a base selected from the group consisting of alkoxides, amides and hydrides. The reaction produces a metallic salt which is removed from the solution, washed with an organic solvent and hydrolyzed with dilute acid to form antioxidant amides of the general formula (D)

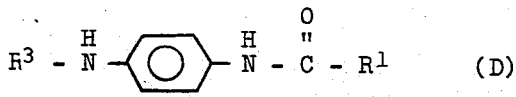

wherein $R^1$ is a radical selected from the group consisting of alkyl radicals having from one to 20 carbon atoms, alkenyl radicals having from one to 10 carbon atoms, aryl radicals having from six to 12 carbon atoms and cycloalkyl radicals having from five to 12 carbon atoms, $R^2$ is a radical selected from the group consisting of alkyl radicals having from one to 10 carbon atoms and alkenyl radicals having from one to 10 carbon atoms, and $R^3$ is a radical selected from the group consisting of alkyl radicals having from one to 20 carbon atoms, cycloalkyl radicals having from five to 12 carbon atoms, aryl radicals having from six to 12 carbon atoms and aralkyl radicals having from seven to 13 carbon atoms.

Representative examples of radicals $R^1$, $R^2$ and $R^3$ useful in the practice of this invention are alkyl radicals such as methyl, ethyl, butyl, pentyl, octyl, decyl, tetradecyl and eicodecyl; aryl radicals such as phenyl napthyl and pentyl phenyl; cycloalkyls such as cyclopentyl, cyclohexyl, dicyclohexyl cycloheptyl and cyclododecyl; aralkyl radicals such as benzyl, methyl benzyl, heptyl phenyl and ethyl phenyl and alkenyl radicals such as ethenyl, propenyl, butenyl, pentenyl, hexenyl, octenyl, nonenyl and decenyl.

The process of the present invention is carried out in an organic solvent. Representative examples of solvents useful in the process of this invention are benzene and toluene.

Representative examples of the compounds which can be used in the practice of this invention are given below.

Group A methylmethacrylate
methyl isobutyrate
methyl benzoate
methyl phenylacetate
ethyl cinnamate
ethyl crotonate
ethyl acetate
ethyl laurate

Group B p-aminodiphenylamine
N-isopropyl paraphenylene diamine
N-hexyl paraphenylene diamine
N-cyclohexyl paraphenylene diamine
p-amino-4'-methyl diphenyl amine p-amino-4'-ethoxy diphenyl amine
p-amino-4'-methoxy diphenyl amine
p-amino-4'-(N,N-dimethylamine) diphenylamine
p-amino-4'-isopropyl diphenylamine
2,6-di-t-hexyl-4-amino phenol
2,6-di-t-butyl-4-amino phenol Group C sodium methoxide
potassium methoxide
potassium tert.butoxide
lithium methoxide
sodium amide
lithium ethoxide
sodium tert.butoxide
sodium hydride
lithium hydride Representative examples of amide compounds are given below.

Group D

N-(4-anilinophenyl) methacrylamide
N-(4-anilinophenyl) benzamide
N-(4-anilinophenyl)-n-butyramide
N-(4-isopropylphenyl) methacrylamide
N-(anilinophenyl) cinnamamide The synthesis described in this application comprises first mixing approximately equivalent molar amounts of the primary aromatic amine and base in a suitable organic solvent and then slowly adding the ester. The mettalic base abstracts a hydrogen from the amine, replacing with metal and forming an alcohol and an alkali amine salt. Next the solution is refluxed and the alcohol or alcohol/solvent azeotrope distillate is removed. The distillate is cooled. The intermediate metal salt formed is removed from solution and washed with an organic solvent such as hexane, toluene or xylene, until the washed solution is clear. The salt is dried and hydrolyzed with dilute acid to form a solid product. The solid product is then removed from solution and air dried at room temperature. This ester process produces no troublesome byproducts.

The primary amines and base can be mixed in any molar ratios desired. The most preferred molar ratio is 1:1 amine:base, although molar ratios of from 1:10 to 10:1 amine:base have been used. The primary amine/base mixture is added to the ester in a molar ratio of from 10:1 to 1:10 amine:ester. The reaction between the amine and the ester is essentially a 1:1 molar reaction such that an excess of one reactant over the other has no effect on the reaction.

The amide compounds described herein are useful as antioxidants in elastomers. They can be incorporated into the elastomer by conventional techniques well known to those of ordinary skill in this art such as by addition to polymer latices or to solid polymers in a Banbury mixer or on a mill. An amide formed from an unsaturated ester such as methyl methacrylate is copolymerizable with conventional unsaturated monomers such as those used in the preparation of unsaturated synthetic elastomers. When copolymerized with these monomers, the amide products become a part of the elastomer molecule, are nonvolatile and are not easily extracted.

In addition to antioxidant amides, the polymer composition can contain other compounding materials such as additives and reinforcing materials which are normally used with vulcanized rubber products. Representative examples of such additives are metal oxides, reinforcing agents, pigments, fillers, softening agents, other antioxidants, plasticizing agents, etc.

Polymers that can be protected by addition of the amides described herein are vulcanized and unvulcanized polymers which are susceptible to oxidative degradation. Examples representative of such polymers are natural rubber, gutta percha, balata and rubbery synthetic polymers containing carbon to carbon double bonds, butyl rubber which is a polymerization product of a major proportion of a monoolefin and minor proportion of a multiolefin such as butadiene or isoprene, polychloroprene, homopolymers of a conjugated 1,3-diene such as isoprene and butadiene containing up to 50 percent by weight of at least one copolymerizable monomer such as styrene and/or acrylonitrile. Other representative polymers are polypropylene, polyethylene, ethylene propylene copolymers and terpolymers of ethylene propylene and a nonconjugated diene. When added in free state normally from about .1 to 5.0 percent of the antioxidant based on the weight of the polymer can be used. Generally from about 1.0 to 3.0 percent by weight of the polymer will be used.

The following examples illustrate the practice of the present invention. Unless otherwise indicated all parts and percentages are by weight.

EXAMPLE 1

A two-liter flask was charged with 120 grams (.65 mole) of p-aminodiphenylamine followed by 700 milliliters of benzene while under a slow nitrogen purge. The mixture was stirred until solution was achieved. Forty grams (.73 mole) of fresh sodium methoxide was added. The solution was stirred for an additional 10 minutes. Eighty-one milliliters (.75 mole) of methylmethacrylate was added and the solution was refluxed forming an intermediate sodium salt and methanol. A benzene/methanol azeotrope was slowly distilled off as formed during the reaction. 325 to 350 Milliliters of the azeotrope was collected. The reaction was cooled to room temperature. The salt was filtered from the mixture and washed with hexane until the filtrate liquid was clear. The salt was dried in air and hydrolyzed with dilute hydrochloric acid (70 milliliters concentrated acid in 1000 milliliters of water). The product was filtered and air dried yielding 97 grams of N-(4-anilinophenyl) methacrylamide having a melting point between 103° C. and 105° C. The yield was 59 percent.

EXAMPLE 2

A one liter flask was charged with 73.5 grams of p-aminodiphenylamine and 300 milliliters of toluene under a slow nitrogen purge. The solution was heated and stirred until solution was achieved. Twenty-seven grams of sodium methoxide was added and the solution was stirred for 5 minutes. 58.5 Grams of methyl benzoate and 100 milliliters of toluene were added and the mixture was heated to reflux forming a white salt. Methanol was formed as described in Example 1. Approximately 30 milliliters of toluene/methanol azeotrope was collected while the reflux temperature rose from 68° C. to 100° C. An additional 220 milliliters of azeotrope was distilled off over a five hour period. The reaction flask was cooled in a water bath and 200 milliliters of hexane was added. The solution was stirred for an additional 10 minutes. The salt formed was filtered from the solution, hydrolyzed with dilute hydrochloric acid and air dried, yielding 73.1 grams (63.4 percent) of N-4-anilinophenyl benzamide having a melting point between 160° C. and 163° C.

EXAMPLE 3

A one liter flask was charged with 73.5 grams of p-aminodiphenylamine and 400 milliliters of toluene under a slow nitrogen purge. The mixture formed a solution and 27 grams of sodium methoxide was added. The mixture was stirred for 5 minutes, 52.2 grams of ethyl butyrate were added and the mixture heated to reflux. The sodium salt was precipitated as a thick semi-solid. Methanol was formed as described in Example 1. 320 Milliliters of toluene/methanol azeotrope and excess toluene were collected. The reaction flask was cooled and 100 milliliters of hexane was added. The excess liquid was decanted and discarded. Fresh hexane (200 milliliters) was added to the salt. The salt was filtered and washed with hexane until the filtrate solution was clear. The washed salt was hydrolyzed with excess dilute hydrochloric acid and dried in air yielding 91.7 grams (90%) of N-(anilinophenyl)-n-butyramide having a melting point between 93°C. and 95°C.

EXAMPLE 4

A 500 milliliter flask was charged with 44.5 grams of N-isopropyl-p-phenylenediamine, 15.4 grams of sodium methoxide and 200 milliliters of xylene while under a slow nitrogen purge. The reaction mixture was warmed to between 80° C. to 90° C. Thirty-five grams of methyl methacrylate was added over a 20 minute period. The solution was heated to low reflux (60°–70° C.) forming a sodium salt and 30 milliliters of distillate was collected. The reaction flask was cooled to 40° C. and the contents filtered while still warm. The salt was isolated and washed with xylene and hexane before being dried in air. The salt was hydrolyzed by adding excess dilute acetic acid, filtered, and air dried at 50° C. overnight. The yield was 33.25 (51%) grams of N-(4-isopropylphenyl) methacrylamide having a melting point between 130° C. and 134° C.

EXAMPLE 5

A one-liter flask was charged with 70.7 grams of p-aminodiphenylamine, 72.3 grams of ethyl cinnamate and 300 milliliters of toluene. The solution was warmed and stirred until the p-aminodiphenylamine was dissolved. 24.3 Grams of sodium methoxide was added and the solution was stirred for an additional 5 minutes. 72.3 Grams of ethyl cinnamate was added, along with an additional 100 milliliters of toluene. The mixture was heated to reflux and 230 milliliters of toluene were distilled off. A very thick, bright yellow salt remained in the flask. The flask was cooled, 200 milliliters of hexane were added and the solution was stirred for an additional 5 minutes. The salt was filtered off and washed with hexane. After drying partially, the salt was placed in a blender with 1 liter of dilute hydrochloric acid (60 milliliters in 1,000 milliliters of water) and blended for 2 minutes. The product was filtered, washed with water and air dried for 72 hours at 50° C. The product, N-(anilinophenyl) cinnamamide, was obtained as a bright green-yellow powder having a melting point between 172° C. and 175° C. The yield was 110.5 grams or 91 percent.

The product can also be recrystallized using an acetone/hexane azeotrope (124 milliliters of hexane and 149 milliliters of acetone) having a boiling point of 49°C.

EXAMPLE 6

A 500 milliliter flask was charged with 26.4 grams of 2,6-di-t-butyl-4-amino phenol, 150 milliliters of xylene and 7.56 grams of sodium methoxide. The mixture was warmed to between 60° C. and 80° C. and 20 milliliters of methyl methacrylate was added dropwise over a 15 minute period. Methanol formed as described in Example 1. The solution was heated until methanol ceased to distill from the solution. During the reaction an intermediate methacrylic salt formed. The flask was cooled, 100 milliliters of hexane and 100 milliliters of dilute hydrochloric acid were added with vigorous stirring. The mixture was placed in a beaker. One hundred milliliters of hexane was added and the salt was filtered from the solution. The salt was washed with hexane until the filtrate was clear and then air dried. The yield was 27.85 grams (80%) of 3,5-di-t-butyl-4-hydroxy phenyl methacrylamide having a melting point between 218° C. and 224° C.

The compounds prepared above were tested as described below.

N-4-anilinophenyl methacrylamide was copolymerized in a free radical polymerization with 67 parts of butadiene and 33 parts of acrylonitrile using cumene hyperoxide (CHP) as the initiator in the recipe set out below. The reaction was carried out at a temperature of 15°C. for 16 hours. Sodium dimethyldithio carbamate was used to shortstop the reaction.

| | |
|---|---|
| Butadiene | 67.00 |
| Acrylonitrile | 33.00 |
| Water | 190.00 |
| Soap | 2.50 |
| $Na_3PO_4$ | .20 |
| Versene $Fe_3$ (in 5 cc .0173 N $H_2SO_4$) | .0568 |
| $FeSO_4 . 7H_2O$ | .0144 |
| Sodium formaldehyde sulfoxylate | .0412 |
| Tert.dodecyl mercaptan | .5 |
| Cumene hydroperoxide | .06 |
| N-4-anilinophenyl methacrylamide samples | 1.80 |

A control sample of N-4-anilinophenyl methacrylamide made by the methacryloyl chloride process was also run at two different initiator levels for comparative data. The polymer formed was coagulated with methanol, extracted for 48 hours with methanol to remove any residual antioxidant, dried and dissolved in benzene. The benzene solution was allowed to evaporate in an aluminum tray and oxygen absorption measurements were made on the resulting polymer films. The results are given in Table I.

Table I

| | CHP (pts) | Percent Conversion | Hours to 0.25% $O_2$ at 100°C. |
|---|---|---|---|
| *MMP | .06 | 86 | 122 |
| MMP | .0236 | 74 | 267 |
| **MCP | .06 | 92 | 157 |
| MCP | .0236 | 87 | 123 |

*MMP — Methyl methacrylate process
**MCP — Methacryloyl chloride process

The copolymerization ability of four different N-4-anilinophenyl methacrylamide samples were compared in the butadiene/acrylonitrile recipe set out above. Samples 1 and 2 were products of the ester/amine synthesis where the intermediate metallic salt was not isolated and the entire solution containing the salt was hydrolyzed. Sample 3 was produced using the process of the present invention wherein the intermediate metallic salt was isolated and washed free of contaminates. Sample 4 was produced using the conventional methacryloyl chloride acylation process known to the art.

Copolymerization in all cases was carried out at a temperature of 15°C. for 16 hours using the same recipe set out above. The reaction was shortstopped using sodium dimethyldithio carbamate. The reaction mixture was poured into excess agitated isopropyl alcohol to coagulate the polymer. No polymer formed when samples 1 and 2 were used. Percent conversion to the polymer form for samples 3 and 4 was calculated based on the weight of the recipe ingredients. The results are set forth in Table II.

Table II

| Polymer Sample | | Percent Conversion (15°C.) 16 hrs. |
|---|---|---|
| 1 | no salt isolation | 0 |
| 2 | no salt isolation | 0 |
| 3 | salt isolated and washed | 86 |
| 4 | pure product | 94 |

Table II shows that the antioxidant product of previous ester/amine reactions contains polymerization stopping-impurities as exemplified in samples 1 and 2. Sample 3 shows that by separating, hydrolyzing and washing the metallic salt without also hydrolyzing the solution containing the impurities, copolymerization can be accomplished without lengthy and costly purification of the antioxidant comonomer. Sample 4 shows the purity and copolymerization ability of the amide produced by the methacryloyl chloride process for comparative purposes.

Some compounds yield intermediate salts which are liquids or semi-solids. Such salts are not susceptible to filtration but can be extracted or washed by decantation of the solvent. The present process is applicable, with variation of separation techniques, to various amides.

All alkoxide, amide and hydride bases disclosed herein are understood to be alkali metal alkoxides, amides and hydrides. Representative examples of these bases are given.

While certain representative embodiments and details have been shown for the purpose of illustrating the invention, it will be apparent to those skilled in this art that various changes and modifications may be made herein without departing from the spirit or the scope of the invention.

I claim:

1. An improved process for the synthesis of an antioxidant amide comprising reacting a simple aliphatic or aromatic ester, either saturated or unsaturated having the general formula (A)

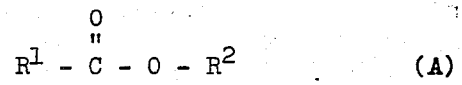

with an aromatic amine having the general formula (B)

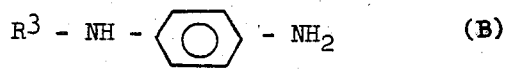

in the presence of (C), a base selected from the group consisting of alkali metal alkoxides, amides and hydrides to yield an intermediate metallic salt, the improvement comprising removing the salt, washing the salt with an organic solvent and hydrolyzing the salt with dilute acid to form an antioxidant amide of the general formula (D)

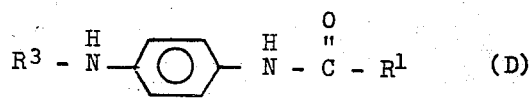

wherein $R^1$ is selected from the group consisting of alkyl radicals having from one to 20 carbon atoms, aryl radicals having from six to 12 carbon atoms, cycloalkyl radicals having from five to 12 carbon atoms, alkenyl radicals having from two to 10 carbon atoms, $R^2$ is selected from the group consisting of alkyl radicals having from one to 10 carbon atoms, and alkenyl radicals having from two to 10 carbon atoms and wherein $R^3$ is selected from the group consisting of alkyl radicals having from one to 20 carbon atoms, cycloalkyl radicals having from five to 12 carbon atoms, aryl radicals having from six to 12 carbon atoms and aralkyl radicals having from seven to 13 carbon atoms.

2. A process as described in claim 1 above wherein the ester is selected from the group consisting of methyl methacrylate, ethyl laurate, methyl isobutyrate, methyl benzoate, methyl phenyl acetate, ethyl cinnamate, ethyl crotonate and ethyl acetate.

3. A process as described in claim 2 wherein the primary aromatic amine is selected from the group consisting of p-aminodiphenylamine; N-isopropyl paraphenylene diamine; 2,6-di-t-butyl-4-aminophenol; N-hexyl paraphenylene diamine; 2,6-di-t-hexyl-4-aminophenol and N-cyclohexyl paraphenylene diamine.

4. A process as described in claim 3 wherein the reaction takes place in the presence of a metal alkoxide selected from the group consisting of sodium methoxide, potassium methoxide, potassium tert.butoxide, lithium methoxide, sodamide, sodium tert.butoxide, sodium ethoxide, sodium hydride and lithium hydride.

5. A process as described in claim 1 wherein the ester is methyl methacrylate, the amine is p-aminodiphenylamine and the alkoxide is sodium methoxide.

6. A process as described in claim 1 wherein the organic solvent is selected from the group consisting of benzene and toluene.

* * * * *